United States Patent
Jeong et al.

(10) Patent No.: US 9,422,427 B2
(45) Date of Patent: Aug. 23, 2016

(54) ARTIFICIAL MARBLE CHIPS, ARTIFICIAL MARBLE CONTAINING SAME, AND PRODUCTION METHOD THEREFOR

(71) Applicant: Cheil Industries Inc., Gumi-si (KR)

(72) Inventors: Doo Kyo Jeong, Uiwang-si (KR); Eung Seo Park, Uiwang-si (KR); Jong Chul Park, Uiwang-si (KR); Chang Ho Son, Uiwang-si (KR); Chang Ho Shin, Uiwang-si (KR); Dong Jun Kim, Uiwang-si (KR); Hyun Cheol Jeon, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 14/368,607

(22) PCT Filed: Nov. 23, 2012

(86) PCT No.: PCT/KR2012/009965
§ 371 (c)(1),
(2) Date: Jun. 25, 2014

(87) PCT Pub. No.: WO2013/100371
PCT Pub. Date: Jul. 4, 2013

(65) Prior Publication Data
US 2014/0350160 A1 Nov. 27, 2014

(30) Foreign Application Priority Data

Dec. 26, 2011 (KR) .......... 10-2011-0142059
Nov. 22, 2012 (KR) .......... 10-2012-0133016

(51) Int. Cl.
*C04B 14/48* (2006.01)
*C04B 26/00* (2006.01)
(Continued)

(52) U.S. Cl.
CPC ............ *C08L 33/12* (2013.01); *C04B 18/022* (2013.01); *C04B 26/06* (2013.01); *C04B 2111/545* (2013.01); *C08K 7/06* (2013.01); *Y10T 428/12431* (2015.01)

(58) Field of Classification Search
CPC ........ C04B 14/38; C04B 14/48; C04B 14/02; C04B 26/06; C04B 26/14; C04B 26/18
See application file for complete search history.

(56) References Cited

U.S. PATENT DOCUMENTS 4,734,452 A   3/1988   Hashimoto et al.
6,127,458 A * 10/2000   Sakai ................. C04B 26/02
                                             523/212

(Continued)

FOREIGN PATENT DOCUMENTS

EP    0211657 A2   2/1987
EP    1149809 A1   10/2001
(Continued)

OTHER PUBLICATIONS

Machine translation of KR 10-0648590 B.*
(Continued)

*Primary Examiner* — Vu A Nguyen
(74) *Attorney, Agent, or Firm* — Additon, Higgins & Pendleton, P.A.

(57) ABSTRACT

An artificial marble chip of the present invention comprises curable resin, metal fiber and/or inorganic fiber, and inorganic filler. The metal fiber and/or inorganic fiber preferably have an average length of about 1 to about 6 mm and an average particle diameter of about 10 to about 15 μm. An artificial marble according to the present invention is produced by using the artificial marble chip, curable resin matrix, and inorganic filler as main components. The curable resin is preferably selected from acrylic resin, unsaturated polyester resin, epoxy resin, or a copolymer thereof. The artificial marble according to the present invention is produced by the steps of: producing an artificial marble composition by mixing the artificial marble chip, the inorganic filler, and other additives into the curable resin matrix; and curing the composition at about 25 to about 180° C. The invention can also include the step of defoaming the composition prior to curing.

10 Claims, 1 Drawing Sheet

(51) Int. Cl.
  C08L 33/12 (2006.01)
  C04B 26/06 (2006.01)
  C04B 18/02 (2006.01)
  C04B 111/54 (2006.01)
  C08K 7/06 (2006.01)

(56) References Cited

U.S. PATENT DOCUMENTS

| | | | | |
|---|---|---|---|---|
| 6,191,229 | B1* | 2/2001 | Sasabe | C08F 8/46 |
| | | | | 524/321 |
| 6,221,300 | B1* | 4/2001 | Sakai | B29C 53/04 |
| | | | | 264/162 |
| 2001/0051674 | A1 | 12/2001 | Renzi et al. | |
| 2006/0121264 | A1 | 6/2006 | Rha et al. | |

FOREIGN PATENT DOCUMENTS

| | | | |
|---|---|---|---|
| JP | 07-315909 | A | 5/1994 |
| JP | 2002-138121 | A | 5/2002 |
| KR | 10-0149842 | B1 | 10/1998 |
| KR | 10-2000-0050332 | A | 8/2000 |
| KR | 10-0609990 | B1 | 8/2006 |
| KR | 10-0648590 | B1 | 11/2006 |
| WO | 2013/100371 | A1 | 7/2013 |

OTHER PUBLICATIONS http://ocvreinforcements-a.hansonstatus.com/pdf/products/BMC-ChoppedStrand_101C_americas_12_2008_Rev1.pdf.*
Machine translation of JP 07-315909 A.*
International Search Report in counterpart International Application No. PCT/KR2012/009965 dated Mar. 13, 2013, pp. 1-4.
Search Report in counterpart European Application No. 12862548 dated Oct. 23, 2015, pp. 1-6.

* cited by examiner

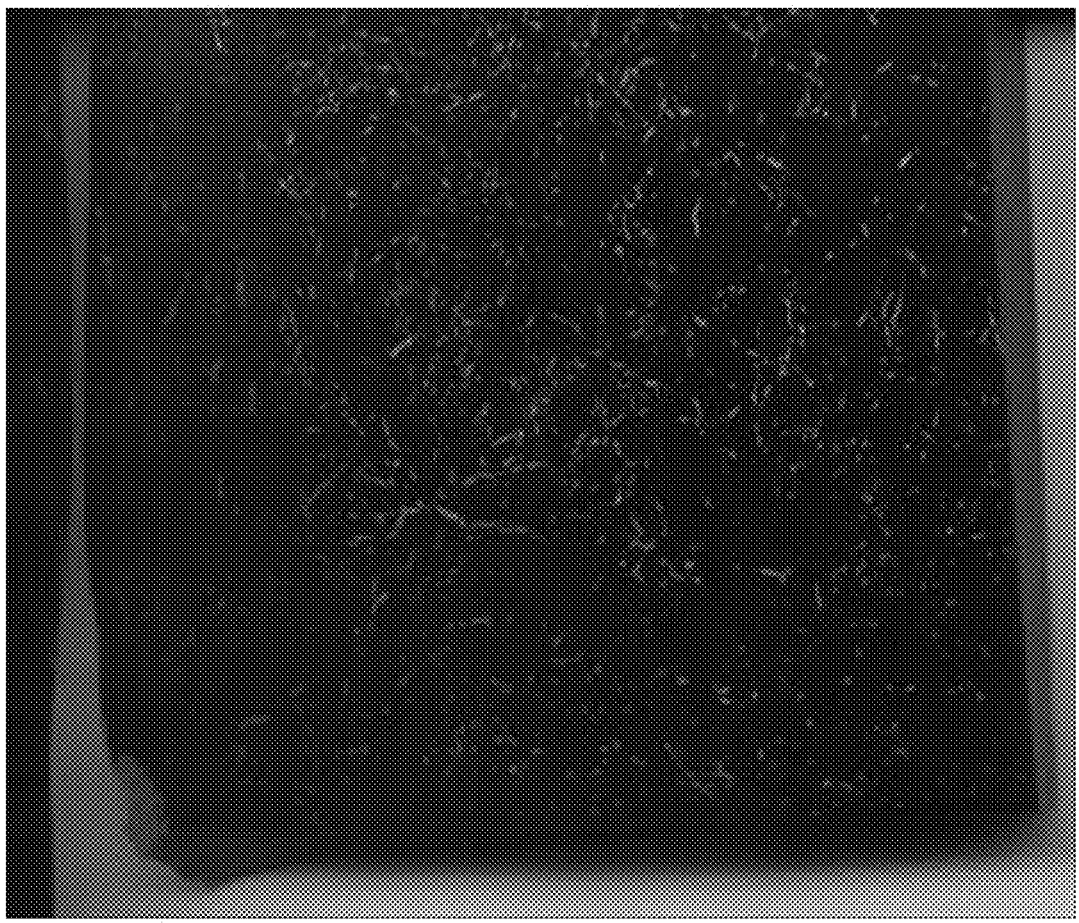

ARTIFICIAL MARBLE CHIPS, ARTIFICIAL MARBLE CONTAINING SAME, AND PRODUCTION METHOD THEREFOR

CROSS-REFERENCE TO RELATED APPLICATIONS

This application claims priority to and the benefit of International Application No. PCT/KR2012/009965, filed Nov. 23, 2012, which published as WO 2013/100371 on Jul. 4, 2013, and Korean Patent Application No. 10-2011-0142059, filed in the Korean Intellectual Property Office on Dec. 26, 2011, and Korean Patent Application No. 10-2012-0133016, filed in the Korean Intellectual Property Office on Nov. 22, 2012, the entire disclosure of each of which is incorporated herein by reference.

FIELD OF THE INVENTION

The present invention relates to artificial marble. More specifically the present invention relates to artificial marble that has the same patterns with natural stones, and excellent fouling resistance and abrasion properties using an artificial marble chip containing metal fibers and/or inorganic fibers.

BACKGROUND OF THE INVENTION

Artificial marble is an artificial composite with the texture of natural stone obtained by mixing base resin selected from acrylic resin, unsaturated polyester resin, epoxy resin, or cement with additives including natural stone dusts, minerals, resin chips, and the like, and by adding additives including pigments and the like if necessary.

The artificial marble is classified into a solid product and a granite product produced by adding the chips, and representative types of the artificial marble include acrylic artificial marble, polyester artificial marble, epoxy artificial marble, melamine artificial marble, E-stone (engineered stone) artificial marble, and the like. The artificial marble has excellent outer appearance, processability, light weight compare to natural marble, and excellent strength, thereby being used as an internal and external finishing material for interior decoration including various upper plate materials, a dressing table, a sink, a counter, a wall material, a floor, furniture, and the like.

The artificial marble with linear stripes can be produced by producing a marble plate using various fibrous materials, and using the chips obtained by crushing the artificial marble with the linear stripe patterns and/or the produced marble plate.

For embodying a pattern similar to the natural stone or a new pattern unlike conventional patterns, stripe patterns or the chips with different sizes, colors, and textures are used.

A method for expressing a pattern with stripes on the artificial marble includes a method of using a liquid-type resin, and a method of using natural fibers or artificial fibers. Of course, the artificial marble with the stripe pattern can be produced by using the chips obtained by using the liquid-type resin, natural fibers or artificial fibers.

However, the artificial marble with the stripe pattern expressed by using the liquid-type resin has a weakness of no three-dimensional effect, and the artificial marble with the stripe pattern expressed by using natural fibers or artificial fibers has a weakness of high water absorption by themselves, and easy contamination of the surface of the artificial marble by unfilled surface of the marble due to pores on the fibers.

Accordingly, the present inventors have developed the artificial marble of the present invention that has excellent fouling resistance and abrasion properties, and the same patterns with natural stones obtained by producing the artificial marble chips containing metal fibers and/or inorganic fibers, and using the artificial marble chips to produce the artificial marble.

Technical Subject

The present invention provides artificial marble that can have excellent fouling resistance and abrasion properties, and the same patterns with natural stones.

The present invention also provides a novel artificial marble chip for preparing the artificial marble that can have excellent fouling resistance and abrasion properties, and the same patterns with natural stones.

The aforementioned and other objects of the present invention will be achieved by the present invention as described below.

SUMMARY OF THE INVENTION

An artificial marble chip comprises metal fiber and/or inorganic fiber, and specifically, comprises curable resin, metal fiber and/or inorganic fiber, and inorganic filler. The metal fiber and/or the inorganic fiber preferably can have an average length of about 1 to about 6 mm, and an average diameter of about 10 to about 15 µm. The curable resin can be acrylic resin, unsaturated polyester resin, epoxy resin, or a copolymer thereof.

The artificial marble of the present invention can be produced by using artificial marble chip, curable resin matrix, and inorganic filler as main components. The curable resin can be acrylic resin, unsaturated polyester resin, epoxy resin, or a copolymer thereof.

The artificial marble of the present invention can be prepared by the steps of: adding the artificial marble chip, the inorganic filler, and other additives into the curable resin matrix to obtain an artificial marble composition; and curing the artificial marble composition at about 25 to about 180° C. The invention can further include the step of defoaming prior to curing.

The detailed description of the present invention based on attached drawings is as described below.

Effect of the Invention

The present invention can provide the artificial marble that can have the same patterns with natural stones, excellent fouling resistance and abrasion properties, and the artificial marble chips for said object.

BRIEF DESCRIPTION OF DRAWINGS

FIG. 1 is a photograph of the surface of artificial marble according to Example A of the present invention.

DETAILED DESCRIPTION OF THE INVENTION

The present invention relates to the artificial marble, and specifically, the artificial marble that can have the same patterns with natural stones, excellent fouling resistance and abrasion properties using artificial marble chips comprising metal fibers and/or inorganic fibers.

The detailed description of the present invention is as described below.

Artificial Marble Chip

The artificial marble chip comprises metal fiber and/or inorganic fiber, and specifically, comprises curable resin, metal fiber and/or an inorganic fiber, and inorganic filler. The metal fiber and/or inorganic fiber can have an average length of about 1 to about 6 mm, and an average diameter of about 10 to about 15 μm.

The artificial marble chip comprising the metal fiber and/or inorganic fiber can offer the same patterns with natural stones by expressing the unique texture of the fibers. Additionally, the metal fiber and the inorganic fiber have no pores unlike natural fiber or artificial fiber, therefore have low water absorption, thereby preventing the contamination and uniformly dispersing the metal fiber and/or inorganic fiber inside the matrix of the artificial marble.

The metal fiber and/or inorganic fiber preferably can have the average length of about 1 to about 6 mm, and the average diameter of about 10 to about 15 μm. When the average length and the average diameter are in said range, the artificial marble chips can be uniformly dispersed in the resin matrix, abrasion properties can be maintained in an excellent state, and beautiful linear stripes can be formed into the same patterns with the natural stones.

Typical example of the metal fiber is aluminum fiber, and typical example of the inorganic fiber is glass fiber or basalt fiber. The aluminum fiber can be preferable. Aluminum itself has high specific gravity, however by using aluminum in a fibrous structure allows the uniform dispersion in the matrix of the artificial marble.

The curable resin for the artificial marble chip can be acrylic resin, unsaturated polyester resin, epoxy resin, or a copolymer thereof, and more preferably, acrylic resin.

The artificial marble chip of the present invention can further comprise additives, such as, inorganic fillers, cross-linking agents, polymerization initiators, coupling agents, curing promoters, pigments, flame retardants, antistatic agents, antibacterial agents, antifoaming agents, dispersing agents, molecular weight control agents, ultraviolet ray absorbers or combinations thereof.

The artificial marble chip of the present invention can be prepared into a chips-in-chips form. For instance, about 100 parts by weight of acrylic resin syrup, about 5 to about 50 parts by weight of aluminum fiber, and about 140 to about 200 parts by weight of inorganic filler are cured, and then crushed to produce the chip in a chips-in-chips form. For more detailed instance, about 100 parts by weight of acrylic resin syrup, about 5 to about 50 parts by weight of aluminum fiber, about 140 to about 200 parts by weight of inorganic filler, about 1 to about 10 parts by weight of cross-linking agent, about 0.1 to about 5 parts by weight of pigment, about 0.1 to about 1 part by weight of molecular weight control agent, about 0.05 to about 1 parts by weight of antifoaming agent, about 0.05 to about 1 parts by weight of dispersing agent, and about 0.1 to about 5 parts by weight of polymerization initiator are cured, and then crushed to produce the chip in a chips-in-chips form. The composition is slowly stirred, and then defoamed in a vacuum condition before curing and crushing to obtain the artificial marble chip.

The artificial marble chip of the present invention preferably can have the hardness of about 40 to about 45 measured by barcol hardness tester (GYZJ 934-1, Barber Colman Company). When the hardness of the artificial marble chip is within said range, excellent polishing properties can be maintained by the similar hardness between the artificial marble chips and curable resin matrix, and linear stripes can be beautifully formed similar to the natural stones.

Artificial Marble

Artificial marble of the present invention can be obtained by using artificial marble chips, curable resin matrix, and inorganic filler as main components. Further, conventional additives can be added. The artificial marble of the present invention can have linear stripe patterns by dispersing the artificial marble chips in the resin matrix.

(A) Curable Resin Matrix

A curable resin matrix is a component forming the outer portion of artificial marble, which can be easily understood and produced by a user with common knowledge within a technical field of the present invention.

Specific kinds of curable resins are not specially limited. The curable resins can include acrylic resin, unsaturated polyester resin, and epoxy resin, a copolymer thereof, or a mixture of two or more resins thereof. The acrylic resin can be preferably used for the curable resin.

The acrylic resin can include acrylic acid, methyl acrylate, ethyl acrylate, isopropyl acrylate, n-butyl acrylate, 2-ethyl hexyl acrylate, methacrylic acid, methyl methacrylate, ethyl methacrylate, isopropyl methacrylate, n-butyl methacrylate, and 2-ethyl hexyl methacrylate, and preferably the methyl methacrylate can be used.

The kind of the unsaturated polyester resin is not specially limited, and specifically, unsaturated polyester resin which is produced by the polymerization of saturated or unsaturated dibasic acid with polyhydric alcohol can be used. The saturated or unsaturated dibasic acid can include anhydrous maleic acid, citraconic acid, fumaric acid, itconic acid, phthalic acid, anhydrous phthalic acid, isophtalic acid, terephthalic acid, succinic acid, adipic acid, sebacic acid, or tetrahydrophthalic acid. The polyhydric alcohol can include ethylene glycol, diethylene glycol, triethylene glycol, propylene glycol, dipropylene glycol, tripropylene glycol, polypropylene glycol, 1,3-butylene glycol, hydride bisphenol A, trimethylol propane monoallylether, neopentyl glycol, 2,2,4-trimethyl-1,3-pentanediol and/or glycerine. Also, monobasic acid such as, acrylic acid, propionic acid, benzoic acid, or polybasic acid such as trimellitic acid and tetracarbon acid of benzole can be additionally used if necessary.

The kind of the epoxy resin is not specially limited, and specifically, bifunctional or polyfunctional epoxy resin can be used. The bifunctional or polyfunctional epoxy resin can include a bisphenol A type epoxy resin, a bisphenol S type epoxy resin, a tetraphenyl ethane epoxy resin, or a phenol novolac type epoxy resin.

The curable resin can be used in a resin syrup form, in which the curable resin is dissolved in a monomer, and the resin syrup contains common monomers and high molecular weight molecules. The high molecular weight molecules can include oligomer or polymer. For instance, the acrylic resin syrup contains only acrylic monomer or mixture of two or more compounds, and additionally contains mixture of the acrylic monomer and polymer in which parts are polymerized in some cases. Specifically the acrylic resin syrup is resin syrup in which about 65 to about 95% by weight of acrylic monomer, and about 5 to about 35% by weigh acrylic polymer are dissolved.

(B) Artificial Marble Chip

A chip produced from previous description can be used.

The artificial marble can further comprise conventional artificial marble chip other than said the artificial marble chip. Saturated polyester marble chip can be used as the conventional artificial marble chip. Specifically, the conventional artificial marble chip can be obtained by curing and crushing about 100 parts by weight of acrylic resin, about 100 to about 200 parts by weight of inorganic filler, about 0.1 to about 10 parts by weight of cross-linking agent, and about 0.1 to about 10 parts by weight of initiator, and can be produced by a conventional method.

The artificial marble chip of the present invention can be used in amount of about 40 to about 100 parts by weight based on about 100 parts by weight of curable resin matrix. When the amount of artificial marble chip is within said range, the strength, the polishing properties, the fouling resistance, the molding properties, and the outer appearance of the artificial marble can be maintained in an excellent condition.

(C) Inorganic Filler

Inorganic filler can include inorganic powder conventionally used in a technical field of the present invention, such as calcium carbonate, aluminum hydroxide, silica, alumina, barium sulfate, and magnesium hydroxide. The inorganic powder preferably can have the size of about 1 to about 100 µm, and specifically, the aluminum hydroxide can be preferable by producing the artificial marble with transparency and beautiful outer appearance of marble. The inorganic filler can be used in amount of about 140 to about 200 parts by weight based on about 100 parts by weight of resin matrix.

(D) Other Additives

Artificial marble of the present invention can comprise one or more cross-linking agents, polymerization initiators, coupling agents, curing promoters, pigments, flame retardants, antistatic agents, antibacterial agents, antifoaming agents, dispersing agents, molecular weight control agents, and/or an ultraviolet ray absorber as additives.

Polyfunctional methacrylate can be used as the cross-linking agent, and specific examples of the polyfunctional methacrylate can include ethylene glycol dimethacrylate, propylene glycol dimethacrylate, glycerol trimethacrylate, trimethylpropane trimethacrylate, and bisphenol A dimethacrylate. The cross-linking agent can be used in amount of about 0.1 to about 5.0 parts by weight based on about 100 parts by weight of resin matrix.

Peroxides including benzoyl peroxide, lauroyl peroxide, butyl hydroperoxide, and cumyl hydroperoxide; or azo compound including azobisisobutyronitrile can be used as the polymerization initiator. Promoter such as organic metal salt or organic amine can be used as well. The polymerization initiator can be used in amount of about 0.1 to about 5.0 parts by weight based on about 100 parts by weight of resin matrix.

The coupling agent is for helping the adhesion of the inorganic filler and the resin, and can be easily used with a user with common knowledge of a field in which the present invention. Preferably, the coupling agent can include silane coupling agent such as 3-(trimethoxycyril)propyl methacrylate, vinyl trimethoxysilane, and vinyl triethoxysilane. The coupling agent can be used in amount of about 0.1 to about 1.0 parts by weight based on about 100 parts by weight of resin matrix.

The pigment can be selected from inorganic pigment, organic pigment, and dye. Preferably, common pigments used in the field of the present invention comprising reddish brown pigment including oxidized steel and the like, yellow pigment including hydrated iron and the like, green pigment including chrome chloride and the like, navy blue pigment including sodium aluminosilicate and the like, white pigment including titanium oxide and the like, and black pigment including carbon black and the like can be used. The pigment can be used in amount of about 0.0001 to about 5.0 parts by weight based on about 100 parts by weight of resin matrix.

An embodiment of artificial marble of the present invention can be obtained by mixing about 100 parts by weight of artificial marble matrix produced by curing the acrylic resin syrup, about 40 to about 100 parts by weight of artificial marble chip, about 140 to about 200 parts by weight of inorganic filler, and a small amount of additives.

Production Method of Artificial Marble

Artificial marble of the present invention is produced by the steps of: preparing artificial marble composition by mixing curable resin matrix, artificial marble chip of the present invention, inorganic filler, and other additives; and curing the composition at about 25 to about 180° C. Defoaming step is additionally included before the curing the composition. The defoaming step can be performed by using defoaming agent, and be performed under the vacuum condition of about 760 mmHg.

The artificial marble composition is cured at about 25 to about 180° C. For adjusting curing properties, amine or sulfonic acid compound can be additionally applied, or saponifying salt of copper, cobalt, potassium, calcium, zirconium, and zinc can be additionally applied with curing agent.

Specifically, the artificial marble of the present invention is produced by the steps of: slowly stirring composition obtained by mixing aluminum hydroxide, the artificial marble chip, trimethylolpropane trimethacrylate, calcium hydroxide, n-dodecyl mercaptan, antifoaming agent, dispersing agent, and polymerization initiator in syrup obtained by dissolving polymethyl methacrylate with methyl methacrylate; and then defoaming the mixture in a vacuum condition; and curing the mixture at about 60° C.

The present invention will be further comprehensive in the following examples, and the following examples are intended for the purposed of illustration and are not be construed as in any way limiting the scope of the present invention.

Embodiment of the Present Invention

EXAMPLES

Production of Artificial Marble Chip

Example A

Artificial marble chip comprising aluminum fibers is produced by the steps of: slowly stirring composition obtained by mixing about 100 parts by weight of syrup produced by dissolving polymethyl methacrylate with methyl methacrylate, about 180 parts by weight of aluminum hydroxide, about 10 parts by weight of aluminum fibers with the average length of about 3 mm and the average diameter of about 12 µm, about 7.0 parts by weight of trimethylolpropane trimethacrylate, about 1.0 parts by weight of calcium hydroxide, about 0.4 parts by weight of n-dodecyl mercaptan, about 0.1 parts by weight of antifoaming agent, about 0.1 parts by weight of dispersing agent, and about 1 parts by weight of polymerization initiator; defoaming the composition in a vacuum condition; curing the composition at about 60° C.; and crushing the cured mixture.

Comparative Example A

The production steps of artificial marble chip are performed in the same condition with the example A, but Three-star, organic synthetic fiber from Il-sin Textile is used instead of aluminum fibers.

Production of Artificial Marble

Example 1

Artificial marble is produced by the steps of: slowly stirring composition obtained by mixing about 100 parts by weight of syrup produced by dissolving polymethyl methacrylate with methyl methacrylate, about 180 parts by weight of aluminum hydroxide, about 40 parts by weight of artificial marble chip of the example A comprising aluminum fibers, about 0.7 parts by weight of trimethylolpropane trimethacrylate, about 1.0 parts by weight of calcium hydroxide, about 0.4 parts by weight of n-dodecyl mercaptan, about 0.1 parts by weight of antifoaming agent, about 0.1 parts by weight of dispersing agent, and about 1 parts by weight of polymerization initiator; defoaming the composition in a vacuum condition; and curing the composition at about 60° C.

Comparative Example 1

The production method is performed in the same condition with the Example 1 instead of using the artificial marble chip obtained from the Comparative Example A.

Physical properties of the produced artificial marble chips and the artificial marbles are measured by the following methods, and the results are indicated in Table 1. The FIG. 1 is a photograph of the artificial marble produced by Example A.

(1) Barcol hardness is measured with about 10×10 cm$^2$ specimen by using a barcol hardness tester (GYZJ 934-1, Barber Colman Company).

(2) Fouling resistance is visually checked if a contaminant is removed in the condition of forcibly contaminating the surface of a product using a permanent oil marker and removing the contaminant from the surface using sand paper of #400 grit.

(3) Water absorption is measured based on ASTM D-570.

TABLE 1

|  | Example A | Example 1 | Comparative Example A | Comparative Example 1 |
| --- | --- | --- | --- | --- |
| Barcol hardness | 40 | 42 | 43 | 42 |
| Fouling resistance | Favorable | Favorable | Poor | Poor |
| Water absorption | 0.9936 | 0.9920 | 1.0150 | 1.0050 |

As shown in Table 1, an artificial marble chip comprising aluminum fibers of Example A has the similar hardness compare to an artificial marble chip comprising regular synthetic fibers of Comparative Example A, and shows favorable fouling resistance and low water absorption.

Additionally, Example 1 which uses the artificial marble chip comprising the aluminum fibers of Example A has the similar hardness compare to Comparative Example 1 which uses the artificial marble chip comprising the regular synthetic fibers, and shows favorable fouling resistance and low water absorption.

The simple change and transformation of the present invention are capable of being easily used for users with common knowledge in the field, and the entire change and transformation are included in the scope of the present invention.

What is claimed is:

1. An artificial marble chip comprising curable resin, aluminum fiber and inorganic filler.

2. The artificial marble chip according to claim 1, wherein the aluminum fiber has an average length of about 1 to about 6 mm, and an average particle diameter of about 10 to about 15 μm.

3. The artificial marble chip according to claim 1, wherein the artificial marble chip has a hardness of about 40 to about 45 measured by barcol hardness tester (GYZJ 934-1, Barber Colman Company).

4. An artificial marble comprising curable resin matrix; artificial marble chip comprising curable resin, aluminum fiber, and inorganic filler; and inorganic filler.

5. The artificial marble according to claim 4, wherein the artificial marble comprises about 100 parts by weight of the curable resin matrix, about 40 to about 100 parts by weight of the artificial marble chip, and about 140 to about 200 parts by weight of the inorganic filler.

6. The artificial marble according to claim 4, wherein the artificial marble further comprises one or more additives selected from the group consisting of inorganic fillers, crosslinking agents, polymerization initiators, coupling agents, curing promoters, pigments, flame retardants, antistatic agents, antibacterial agents, antifoaming agents, dispersing agents, molecular weight control agents, and ultraviolet ray absorbers.

7. The artificial marble according to claim 4, wherein the aluminum fiber has an average length of about 1 to about 6 mm, and an average particle diameter of about 10 to about 15 μm.

8. The artificial marble according to claim 4, wherein the curable resin is acrylic resin, unsaturated polyester resin, epoxy resin, or a copolymer thereof.

9. A production method of artificial marble comprising steps of:
preparing an artificial marble composition by mixing artificial marble chip according to claim 1, inorganic filler, and additives into curable resin matrix; and
curing the composition at about 25 to about 180° C.

10. The production method of artificial marble according to claim 9, wherein the production method further comprises defoaming step before curing the composition.

* * * * *